United States Patent

Wessling, III

[11] Patent Number: 5,774,338
[45] Date of Patent: Jun. 30, 1998

[54] BODY INTEGRAL ELECTRONICS PACKAGING

[75] Inventor: Francis Christopher Wessling, III, Madison, Ala.

[73] Assignee: McDonnell Douglas Corporation, Huntington Beach, Calif.

[21] Appl. No.: 717,410

[22] Filed: Sep. 20, 1996

[51] Int. Cl.⁶ .............................. H05K 5/00; A45F 5/02; G06F 1/16

[52] U.S. Cl. ................... 361/730; 2/94; 224/606; 224/637; 224/223; 224/930; 361/686; 361/733

[58] Field of Search ........................... 2/95, 93, 94, 102; 235/462, 472, 486; 224/222, 601, 606, 930, 267, 929; 361/724, 725, 680, 684, 683, 686, 679, 729, 730, 731, 733, 746, 807, 809, 810, 826, 814; 364/708.1; 345/169; 429/127; 219/497, 211; 381/187, 24, 151, 90; 439/894, 577, 523; 362/103, 105, 106

[56] References Cited

U.S. PATENT DOCUMENTS

| | | | |
|---|---|---|---|
| 417,301 | 12/1889 | Weldon | 224/223 |
| 4,462,525 | 7/1984 | Pingleton et al. | 224/223 |
| 4,589,134 | 5/1986 | Waldron | 381/90 |
| 4,825,471 | 5/1989 | Jennings | 2/94 |
| 4,876,724 | 10/1989 | Suzuki | 381/187 |
| 5,148,002 | 9/1992 | Kuo et al. | 219/211 |
| 5,211,321 | 5/1993 | Rodriguez | 224/930 |
| 5,285,398 | 2/1994 | Janik | 364/708.1 |
| 5,302,806 | 4/1994 | Simmons et al. | 219/211 |
| 5,333,768 | 8/1994 | Krentz | 224/223 |
| 5,416,310 | 5/1995 | Little | 235/462 |
| 5,416,730 | 5/1995 | Lookofsky | 364/708.1 |
| 5,488,361 | 1/1996 | Perry | 340/984 |
| 5,491,651 | 2/1996 | Janik | 364/708.1 |
| 5,494,157 | 2/1996 | Golenz et al. | 206/722 |
| 5,533,655 | 7/1996 | Duque | 224/637 |
| 5,553,148 | 9/1996 | Werle | 381/24 |
| 5,555,490 | 9/1996 | Carroll | 361/686 |
| 5,572,401 | 11/1996 | Carroll | 361/683 |
| 5,581,492 | 12/1996 | Janik | 364/708.1 |

*Primary Examiner*—Donald Sparks
*Attorney, Agent, or Firm*—Bell Seltzer Intellectual Property Group of Alston & Bird, LLP

[57] ABSTRACT

A body integral electronics package housing is formed of cloth material that simulates a person's garment, such as a poncho or vest. The housing contains various pockets to confine various electronic modules, including a front pocket of such size as to overlie the breast and midriff portions of the person's torso. The front pocket confines a plurality of rigid electronic modules that are supported within the pocket in a row and column array. The user may twist or turn his torso and bend forward or back and the foregoing array, and the modules do not restrict that movement. Instead, the position of the individual modules independently adjusts to the torso's position.

10 Claims, 4 Drawing Sheets

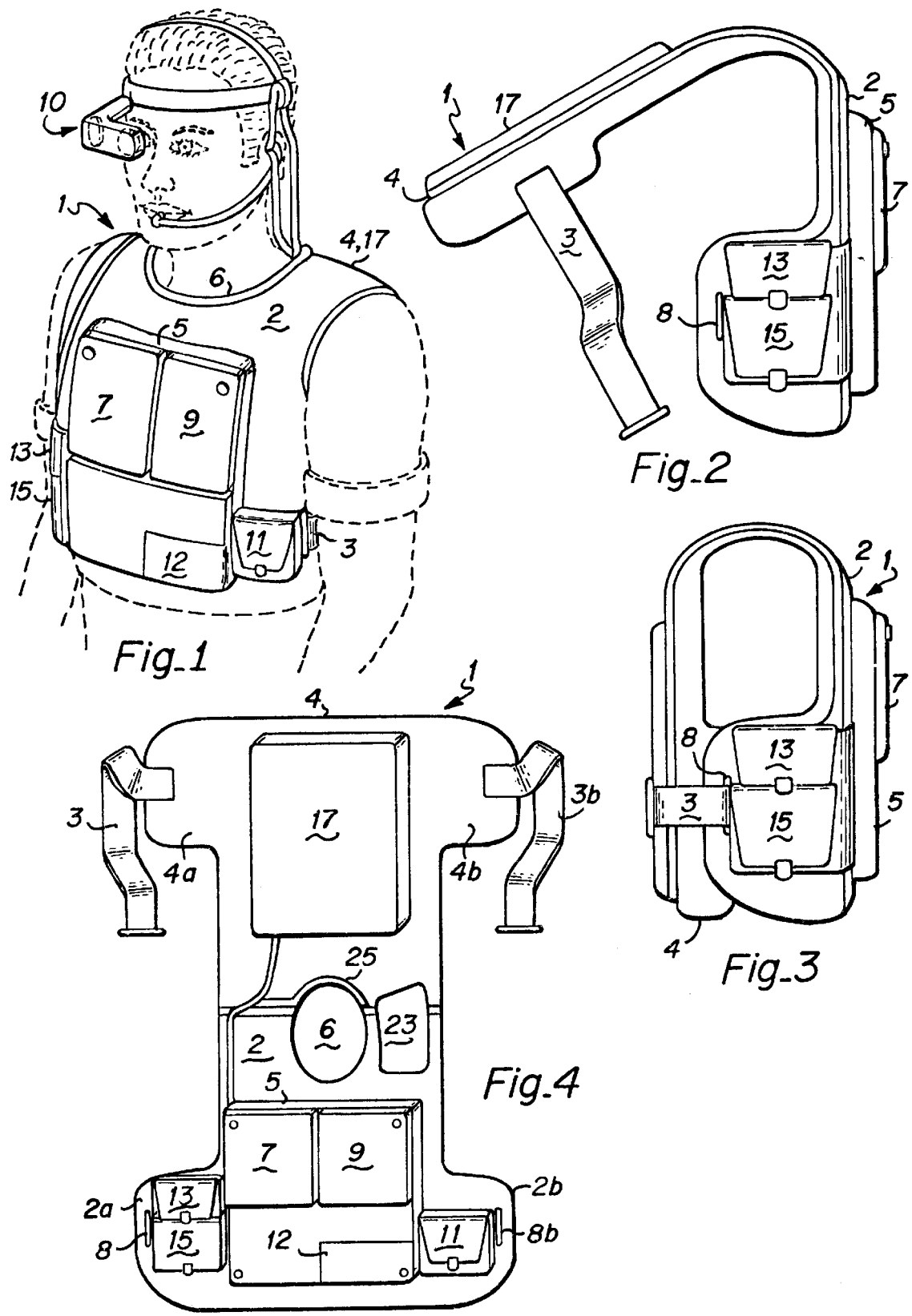

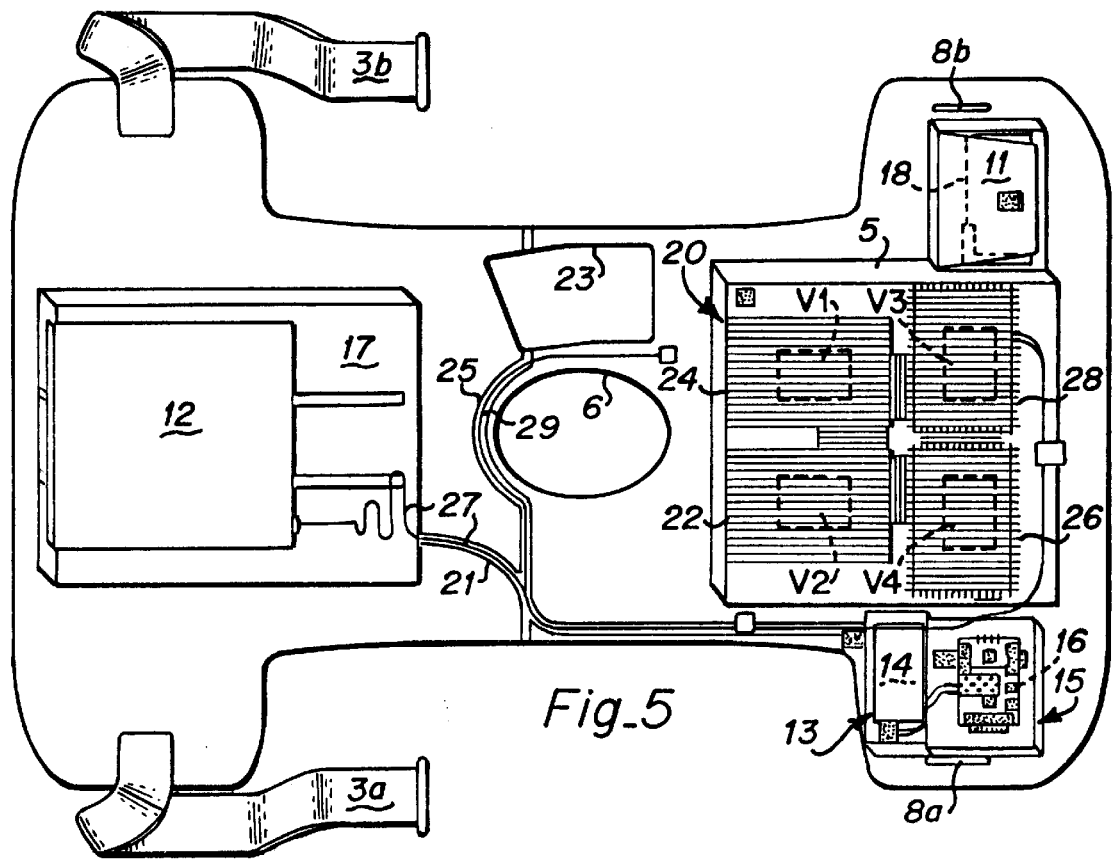
Fig_5
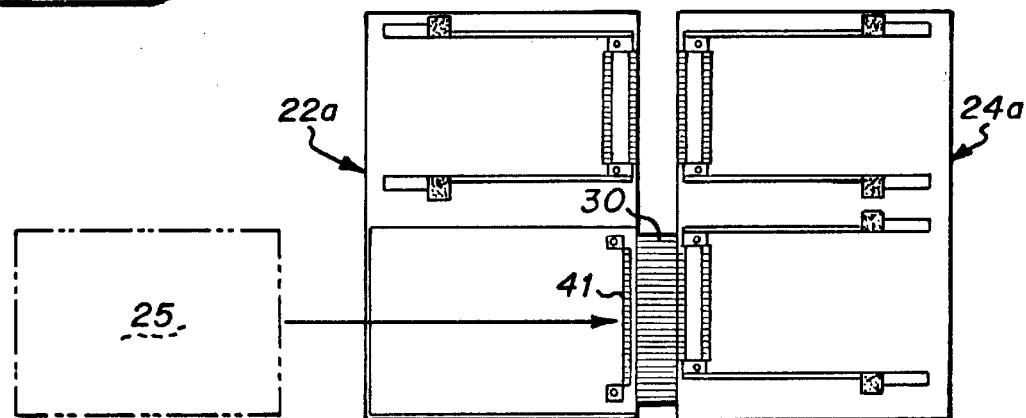
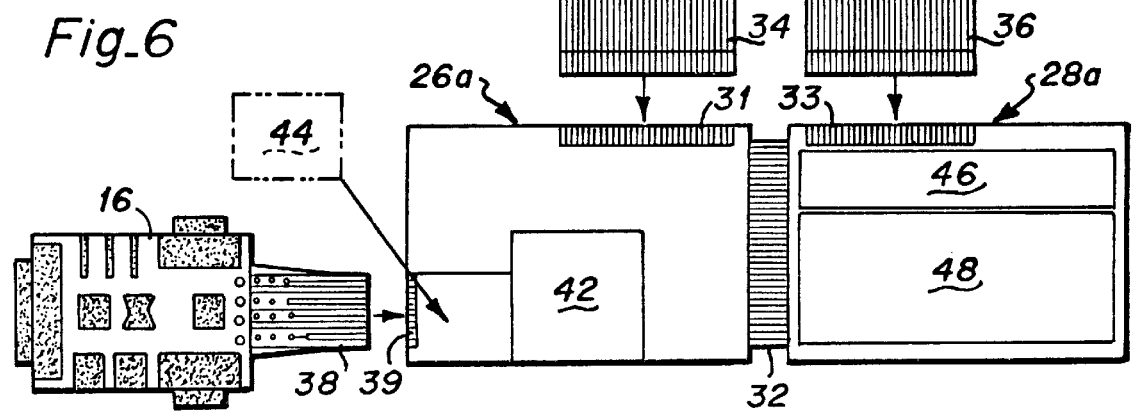
Fig_6

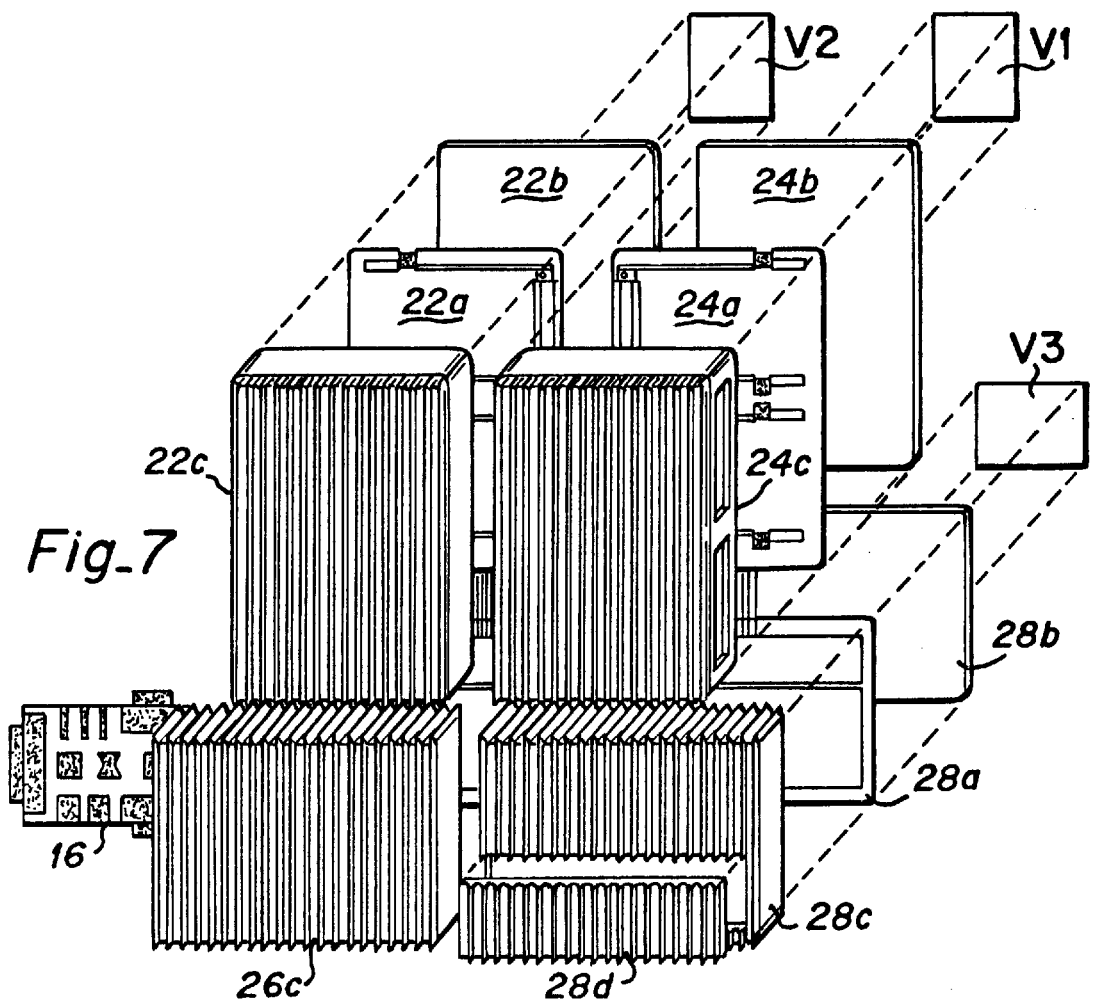
Fig_7
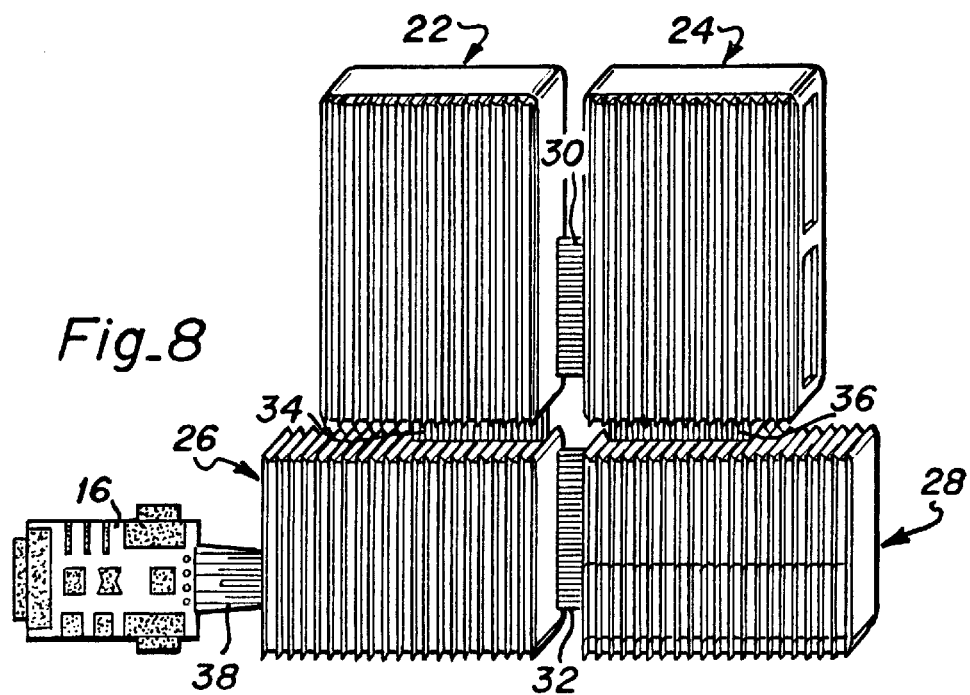
Fig_8

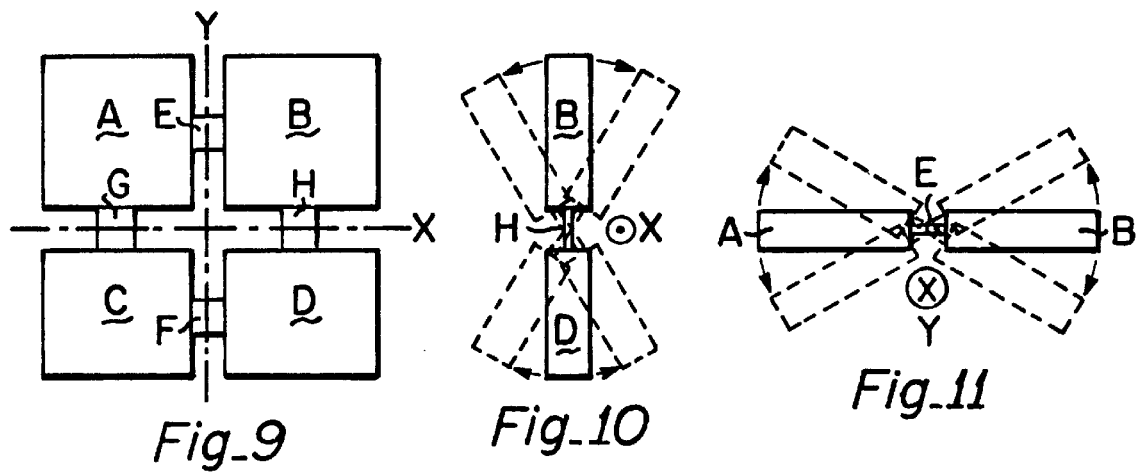
Fig_9  Fig_10  Fig_11
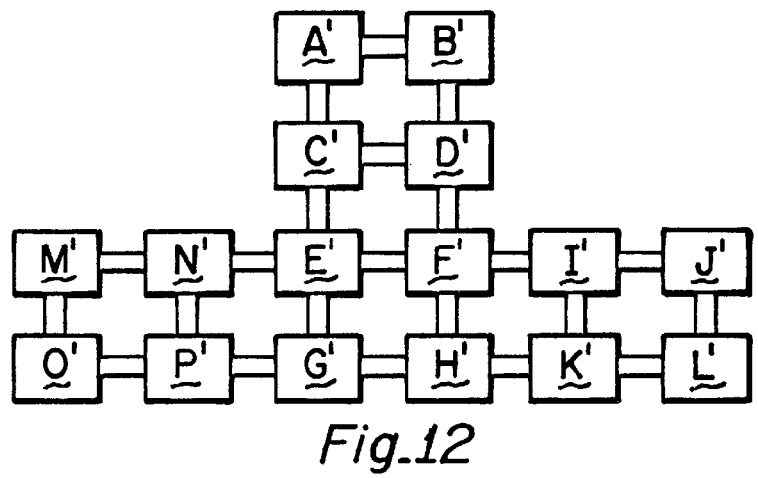
Fig_12
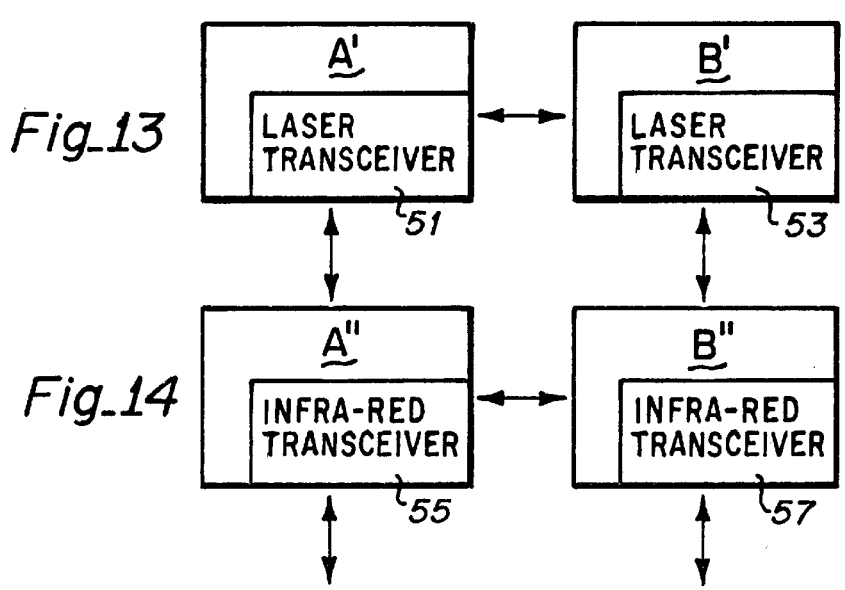
Fig_13
Fig_14

BODY INTEGRAL ELECTRONICS PACKAGING

The invention described herein was first conceived in the performance of Advanced Research Projects Agency (ARPA) contract no. DAAK60-95-C-2029 and is subject any rights that such U.S. Government Agency may hold pursuant to the provisions of such contract.

FIELD OF THE INVENTION

The present invention relates to packaging for portable electronic apparatus, and, more particularly, to a container of garment material that houses a large size multi-component electronic device, such as a computer, and, simulating a garment, adapts that device for transport upon and use while on a human torso.

BACKGROUND OF THE INVENTION

The ability to carry a functional electronic device about on the person is well accepted as a desirable characteristic of electronic product. Such portability is a principal factor motivating the microminiaturization of electronic circuits, as advance in technology permits. By making the device small enough in size and weight, it is very portable and easily carried on the person, as witnessed by the now realized "Dick Tracy" type wrist radio, that but a few generations ago was merely a visionary's dream. By reason of such miniaturization technology, one presently has the ability to tuck a radio, a cellular telephone, or even a small television in a jacket pocket and carry such electronic devices around on the person for possible use. Even with miniaturization, in practice one finds that other electronic devices grow in complexity and size, the benefits of success in miniaturization being consumed by the addition of more functions.

Others have heretofore wrestled with the desirability of carrying an electronic device on a persons garment, such as by including such device on a jacket or belt. In U.S. Pat. No. 4,876,724 granted Oct. 24, 1989, Suzuki describes a personal sound system concealed within a man's jacket, specifically a component stereo system assembled from a battery power supply, amplifier, CD player, tape player and loudspeakers speakers. The system components are distributed amongst various velcro fastened or zipper fastened pockets formed on the front portion of the jacket, on the sleeve, and on the back. Electrical cables to hook-up those components are run around the jacket covered by a snap fastened or velcro fastened fabric flap.

Suzuki's custom built jacket offers the user the advantage of a fashionable jacket and the ability to conceal and carry about a portable stereo system virtually hands-free. All of the electronic components in Suzuki's combination are commercially available products and it is seen that the miniaturization of those electronic products renders Suzuki's combination possible.

In U.S. Pat. No. 5,416,310 granted May 16, 1995, Little integrates a portable digital data system into a vest type garment for enhanced portability and ease of use. That data system includes manual and alphanumeric input devices, a computer and a data display device. The cables or conductors may be sewn into channels in the garment or woven into the garments fabric. The digital computer is held in a vest pocket, firmly held by a strip of velcro attached to the back side of the computer that engages a mating velcro strip within the pocket. The display is hinged to the computer and can be flipped out to allow the wearer to view the display. The bar code reader, connected to the computer by a long electrical cord, may be removed from the pocket use in scanning.

One visualizes that Little's system allows a warehouse person to use the bar code reader to take inventory without requiring the person's other free hand to carry the computer, making the job of taking inventory a little bit easier. The electronic components in Little's combination are seen as commercially available products. And it is seen that the miniaturization of those electronic products also renders Little's combination possible.

In U.S. Pat. No. 5,285,398 granted Feb. 8, 1994, Janik proposes carrying a computer within a flexible belt. More specifically, Janik proposes a flexible wearable computer containing a processor module, mass memory module, power supply module and bus termination module that are interconnected by flexible circuits. The computer system is held in place on the body by a strap, referred to as a flexible non-stretchable wearable member. The strap is to be carried fastened the waist, like normal belts. Janik shows that such straps may be draped along the back side or on the front side of a vest type garment. Hands free portability, adaptation to a wide variety of human morphologies, a variety of sizes and shapes, more comfortably carried and operated than an integrated computer in rigid rectilinear or curvilinear packages, and can more easily and comfortably be expanded than rigid package designs. The computer is encased in flexible compressible polyurethane foam sheath and each encase module is also connected to the tensile load strap. Tensile load strap is a belt strap consisting of woven Aramid fibers, or nylon strapping or thin steel stranded cables.

Recognizing the need to address the user's comfort and portability concurrently, Janik's solution is the flexibility of an ergonometric belt, which, more likely than not is worn about the waist, but also could be draped on the outside of a vest, Janik's combination appears plausible for computers whose elements may be placed along a rectilinear member, such as a belt, which, in useable lengths for application to the human form, is minimally eight to twelve inches in length. However, that arrangement is not acceptable, as example, for high performance computers, which the present invention addresses. PENTIUM class computers contain a peripheral component interconnect ("PCI") bus or faster bus, in which a distance greater than eight inches or so represents a significant time for electronic pulses to traverse that distance between components. Hence, the modules for that computer must be located close together. As is known PCI based computer busses operate at between 33 MHz to 66 MHz or 30.3 to 15.15 nanoseconds. And it is anticipated that electronic busses in the future will have even greater speeds.

Unlike Little and Suzuki, Janik does not rely on inclusion of preexisting miniaturized electronic system, but instead Janik constructs the system from elemental components in separate modules to fit within the small width and extended length of a belt or strap. The present invention also deals with ergonometric concerns for the user of the electronics package. Not only should the user's hands be free when moving about, but the electronics package should be comfortable. For that, the package should conform to the shape of the body and possess sufficient flexibility so as not to restrict the user's movement. Janik's combination provides a plausible solution provided one is able to fabricate the apparatus within the confines of a belt. It does not appear practicable for large size electronic apparatus or, particularly, large electronic assemblies that typically form high speed digital computers.

An electronic device, such as a military computer, is formed of large sized electronic modules, which are interconnected together electrically. Those modules in total are large enough in size, that is, surface area, to cover the chest or back of a person of average size.

As an advantage, the present invention provides a garment-like container for supporting large electronic assemblies ergonometrically on the human body, allowing a person wearing that electronic assembly to move about without restraint imposed by that electronic assembly.

Accordingly, an object of the invention is to provide a new housing for electronics apparatus that is conveniently carried by the user upon the user's person.

A further object of the invention is to provide a computer housing of cloth material that may be worn by the user without restricting the user's body movement.

An additional object is to provide an ergonometric housing for a digital computer or for other electronic equipment that one may wish to carry about while allowing the user relatively unrestrained body movement.

SUMMARY OF THE INVENTION

In accordance with the foregoing objects, a body integral electronics package housing is formed of cloth material that simulates a person's garment, such as a poncho or vest, and contains a front pocket or flap of such size as to overlie the breast and midriff portions of the person's torso, and other pockets or flaps. The electronic modules are confined within the various pockets or flaps. A number of rigid electronic modules are assembled into a row and column array and that array is confined and supported within the front pocket.

Suitably each module is individually supported to the cloth material within the pocket by hook and loop type fasteners. Electronic interconnections between the modules, such as flexible cables, infra-red transceivers or the like, ties the modules into a unitary functional electronics device. With the foregoing, the user may twist or turn his torso and bend forward or back and the foregoing array, by reason of the flexible interconnections between adjacent modules provided by the cloth material.

Body integral electronics packaging solves the conflict of placing bulky high speed electronic systems on the human body. High speed electronics requires close proximity of circuits that results in bulky and inflexible packaging using conventional methods. An electronic structure that includes printed circuit board sections that are each surrounded with a stiff or rigid shield, as may be formed of metal, polymer or composite shield and flexible circuit interconnections to electronically join the separate printed board sections, as found in the present invention, avoids the bulk and inflexibility impediments to placement on the human body.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

BRIEF DESCRIPTION OF THE DRAWINGS

In the drawings:

FIG. 1 illustrates the electronic package as worn upon a human torso;

FIG. 2 illustrates the geometry of the electronic package from a side view prior to fastening upon a human torso;

FIG. 3 illustrates the same side as in FIG. 2 after the electronic package is fastened to the torso;

FIG. 4 is a top layout of the electronics package of FIGS. 1–3;

FIG. 5 is another top layout view with portions uncovered to show the electronics apparatus not visible in FIG. 4;

FIG. 6 illustrates an example of the physical relationship of individual modules elements forming the electronic apparatus in FIG. 5;

FIG. 7 illustrates the additional elements added to the components of FIG. 6;

FIG. 8 shows the electronic apparatus of FIG. 5 as assembled for inclusion within the combination of FIGS. 1–5;

FIGS. 9, 10 and 11 are pictorial illustrations used in connection with a discussion of the principals of operation of the invention;

FIG. 12 illustrates an alternative module arrangement that may be substituted for that of FIG. 6 or used for other electronic equipment that is easily separable into many small modules; and FIGS. 13 and 14 are block diagrams of a portion of an alternative embodiment of the invention employing wireless inter-module communications.

DETAILED DESCRIPTION OF THE PREFERRED EMBODIMENTS

Reference is made concurrently to FIGS. 1, 2, 3 and 4 which illustrate the external appearance of the new computer package. FIG. 1 pictorially illustrates the external appearance of an ergonometric digital computer package installed on a person's torso. The electonic package includes the computer's housing or container 1 and the electronic elements packaged therein, not visible in the figure. The container is formed of a sheet of cloth material or the like, suitably cotton or nylon, that is of sufficient suppleness to lie on the torso draped over the person's shoulders for support.

The sheet contains a central opening 6 that fits over the person's head and onto the torso, resembling a familiar poncho type garment, but one in which its front and rear panels, 2 and 4, have been fastened together by straps 3 to ensure attachment and a tight fit on the person's torso. The container includes various pockets, 5, 7,9, 11, 13, 15 and 17, housing portions of the digital computer system and associated peripherals, discussed in greater detail hereafter, some of which are visible in the figure. As shown in the figure, the user carries a head mounted display assembly 10 that is connected to the confined computer by appropriate cabling and allows the person to view the computer's output leaving the person's hands and arms free.

FIG. 2 shows the appearance of the computer package from the side as the package lies unfastened, as example, on the shoulders of the users torso. Strap 3 contains a hook end. The strap fits through a slot 8 in a lower flap on front panel 2. A like strap and slot fastening arrangement, 3B and 8B, is included on the opposite side of the container, illustrated herein in later figures. A more preferred arrangement for such fastening is to incorporate side loops attached to the material, another conventional attachment device, and fasten the strap to the side loop. Further the straps may be adjustable in length to better tailor the fit to any particular user. FIG. 3 shows the same side of the computer package as fastened by straps 3 to firmly press the front and rear panels of the container sheet against the respective chest and back of the user's torso.

As illustrated in FIG. 4, the container includes a circle shaped head opening 6 in the center, large enough in size to allow a human head to pass through. For reference, the portion of the sheet below opening 6 in the figure is referred to as the front portion or front panel 2 and that portion above that opening is referred to as the back portion or back panel 4. The sheet is cut to an overturned H-shape geometry in appearance with sidewardly extending flaps 2a and 2b at the front end and flaps 4a and 4b, the legs of the "H", located at the back end.

Front pocket 5, referred to as the motherboard pocket, is essentially square shape in exterior geometry. That pocket is sewn to the sheet and essentially covers the entire front panel 2 and covers the torso's breast and mid-riff sections. The pocket forms a shallow cavity into which the computer motherboard, elsewhere herein described, is inserted. The upper end of pocket 5 is closed by a rectangular flap with a familiar hook and loop type cloth fastener, not illustrated. Hook and loop type fastener elements are included inside the pocket on the pocket's side panel wall, the part most proximate the user's chest, but are not visible in this figure. The latter hook and loop fastener elements are to engage the complementary fastener element that is atached to the circuit board or chassie of the modules placed in the pocket, which structure becomes more evident from the description later herein. Additionally a hook and loop fastened flap 12, serves as the Dram cover, to allow access to a confined portion of the heat shield, specifically to plate or cap 28d, later herein described in connection with FIG. 7.

A pair of smaller side pockets 7 and 9 are sewn in place atop the front side wall of pocket 5 in side by side relationship. Those additional pockets are essentially square in appearance and of equal size. They serve to house one or more electrical probes, not illustrated, and/or other useful electronic tools. As is known to those skilled in the art, probes are electronic devices that contain an electrically conductive tip that may be touched against an object or electrical device to extract information; a voltmeter probe as example.

A pair of small flapped side pockets, 13 and 15, are sewn to the sheet positioned to one side of pocket 5 on left front flap 2a and are placed one over the other. Pocket 13 serves to house the computer's head mounted display ("HMD") board, which interfaces the head mounted display to the computer, and pocket 15, the computer's input output module. Another small flapped pocket 11, is sewn to flap 2b on the sheet, located to the right side in the figure. Each of the foregoing pockets includes a flap to close the pocket, the flap being fastened down by a hook and loop type cloth fastener.

A large rectangular shaped pocket 17 is sewn in place on the back panel 4 and essentially covers a major portion of the back surface. This pocket serves to house a battery pack that supplies electrical current to power the enclosed computer system.

Several cloth conduits are formed to provide protected passages for some of the electrical cables that interconnect some of the electronic modules that form the computer. This includes wire conduit 21, formed of a strip of cloth material, that extends from the battery pack pocket 17 on back panel 4, extends over the shoulder portion of the sheet to the motherboard pocket 5 on the front panel 2. The conduit is held to the sheet by appropriate VELCRO type hook and loop fasteners. A shoulder access flap 23, also formed of the cloth material, extends over the sheet's shoulder portion, shown to the right side in the figure. Flap 23 is a wide conduit. It also includes hook and loop fasteners to hold the cloth strip in place on the sheet. Another cloth conduit 25 extends from shoulder access flap 23 around the rear perimeter of head opening 6 to a branch or juncture with cable conduit 21.

Each front side flap contains a belt slit 8 and 8B and the corresponding rear flaps contain straps 3 and 3B, which attach through the corresponding slits to join the flaps together and fasten the computer assembly to the user's torso as earlier illustrated in the side views of FIGS. 2 and 3.

FIG. 5 shows the electronics package of FIG. 4 turned counter-clockwise by ninety degrees with the pockets depicted as transparent to allow viewing the internal contents, the electronics portion of the package. Battery 12 is installed in the rear battery pocket 17, HMD board 14 is installed in pocket 13, global I/O module 16 in pocket 15 and an optional wireless module 18 is installed in pocket 11. Electrical hook up cable 27 extends from battery 12 to a connection on circuit board 28 that contains the power supply circuits. Cable 29 runs from the head mounted display 10, illustrated in FIG. 1, into conduit 25, to conduit 21 and terminates at the head mounted display board 13.

The computer motherboard 20 in pocket 5 is seen to be of large physical size. As a feature to the invention, the motherboard and associated chassie is formed of four separate interconnected modules 22, 24, 26 and 28, as shown in FIG. 8 that are positioned in side by side in a 2×2 array relationship. Module 22 is positioned essentially over the left breast of the torso, module 24 is positioned over the right breast of the torso, module 26 is positioned over the right mid-riff and module 28 is positioned over the right mid-riff. The modules are held in that position to the cloth panel by the hook and loop type fasteners located on the bottom side of the chassie, illustrated in the rectangular patches V1, V2, V3, and V4, represented in dash lines.

A better view of the motherboard construction is presented in FIGS. 6, 7 and 8, which illustrate separate stages in the motherboard's assembly. For convenience the principal component parts that mechanically form each of the modules 22, 24, 26 and 28, of which there are three in number, is identified by the corresponding number and an accompanying letter, with the circuit board portion, as 28a, the inner insulating shield as 28b, which is oriented toward the users chest, and the top cover for the heat shield case as 28c, the latter of which is oriented away from the users body. Three of the hook and loop fastener components, attached to the backside of the insulating shield 28b are visible in this exploded view.

As illustrated in FIG. 6, a circuit board 22a is electrically connected to adjacent circuit board 24a by a flex line 30 and circuit board 26a is connected to adjacent board 28a by another flex line 32. Further, circuit board 22a contains another flex line 34 that extends down to circuit board 26a and is inserted within an electrical connector 31 on the latter board electrically interconnecting those two circuit boards. Likewise another flex line extends down from circuit board 36 to circuit board 24a and is inserted within a connector 33 on the latter board, electrically interconnecting those two boards as well. It is seen that, mechanically, the foregoing modules are arranged in rows and columns to form a 2×2 array.

As those skilled in the art appreciate upon reading this specification, the invention is not limited to a 2×2 array. Larger arrays may be substituted. Additional rows and/or columns of varying size may be added to further expand the overall board area if desired. As example, an array illustrated in FIG. 12, to which brief reference is made, may be substituted. As symbolically illustrated, a number of smaller sized modules A' through P' are shown in which modules A' through H' form a 2×4 array that fits across the users chest and stomach and two additional 2×2 arrays are integrated along the bottom side of the foregoing array as may extend partially about the right and left sides of the user's waist. Each of the foregoing modules may be confined within pockets on the container, individually supported by hook and loop fasteners to the pocket's rear side wall panel.

Continuing with the description of the principal embodiment and making reference again to FIG. 6, the input output board 16, which installs in a separate pocket is connected to board 26a by a flex line 38 that extends from a side of the I/O board and is inserted into an electrical connector 39 located on adjacent circuit board 26a. Flexible line 38 permits the front panel flap 2a (FIG. 4) to bend around the side of the user's torso. The dynamic random access memory or DRAM 48 is installed on board 28a and adjacent power supply current and voltage regulation chips 46 are also located on that board. A hard disk drive 25, which is a commercially available computer memory peripheral resembling a rectangle in geometry, typically employed in present lap top computers, plugs into the connector 41 on circuit board 22a to serve as a peripheral memory for the computer. The micro processor chip 42 is located on circuit board 26a. A sound board 44 may be added to the system as an option.

As illustrated in FIG. 7 the four circuit boards are received within a respective open end of a rigid metal heat sink 22c, 24c, 26c and 28c, respectively, and a rigid metal back cover, only three of which are illustrated, 22b, 24b and 26b, fits into the rear of the metal containers to close the container confining the respective circuit board in place. This results in the assembled configuration illustrated in FIG. 8 and earlier illustrated in reduced scale in FIG. 5. What results is an essentially two dimensional row and column array of rigid modules connected to adjacent modules by flexible line. The array forms a digital computer and, physically, each module may be moved in position slightly, relative to the others, to tilt or twist the module from the two dimensional plane.

It is noted that the heat shield container 28c contains a plate or cap portion 28d, illustrated with the plate removed, that allows access to a portion of the memory board connectors. The cap covers additional memory chips to be inserted as needed to the memory board. A plate may be used as an alternative to a cap. So doing reduces the available memory but provides for a flat top across case 28c.

The foregoing description identifies major component element and accessories found in most all modern desktop or laptop digital computers and the suggested placement within container 1. It is recognized that the computer circuits, which are well known to those skilled in the art, are not described or illustrated in detail, since those details are not necessary to the understanding of the invention and do not influence the mechanical assembly.

The four modules 22, 24, 26 and 28 in the motherboard are pictorially represented in FIG. 9 as blocks A, B, C, D. Those blocks are tied in the assembled rows and columns by the hook and loop fasteners and are electrically interconnected by flexible bands E, F, G, and H, representing the flexible electrical cables 30, 32, 34 and 36 in the preceding figures. The blocks are located in the four quadrants of a Cartesian coordinate system represented by axes X, the horizontal, and Y, the vertical, with those axes extending in the regions separating the blocks that are traversed by the flexible strips. As illustrated from the side in FIG. 10, it is possible for either or both of blocks B or D to essentially pivot about the X axis, forward or backward, because of the resilience of the flexible strips, limited in movement by the cloth pocket panel, not illustrated in this pictorial view. As viewed from the top, it is seen that either or both of the pairs of blocks A and C or B and D to pivot about the vertical axis as well, either forward or back. It is also possible for any one block to twist in position relative to any of the others. The modules as earlier stated are rigid in physical character. As such they cannot conform readily to changes in the surface.

Block A is sized to essentially cover the left breast area of the torso and B the right breast area. Block C covers the left midriff region of the torso, and block D covers the torso's right midriff region. As the assembly is mounted on the user and the ends fastened to press the pocket containing the foregoing assembly against the users chest and midriff, one readily visualizes that the foregoing assembly adjusts to the proportions of the users chest and midriff by simply pivoting one way or the other as described. And as the user moves and changes his chest and/or midriff position, the assembly is free to appropriately bend to fit each interim physiogomy the user attains and does not restrict the user's movements. The foregoing thus provides an ergonometrically correct electronics package that essentially mates with the user's torso. The foregoing mode of operation is also applied with the greater multiple number of modules presented in the alternative embodiment of FIG. 12, earlier described.

The stiff or rigid chassie may be formed of any appropriate material, such as copper, copper graphite, aluminum, aluminum graphite, steel, polymer or composite material, to name a few.

The foregoing embodiment employs flex circuits for electrically interfacing between modules, which also provides a slight degree of interactive mechanical support between the modules assisting in maintaining the array formation. In alternative embodiments those flex circuits may be replaced by alternative interfaces such as infra-red type communication devices, laser type communication devices, inductive communication devices. The foregoing wirelessly interconnected modules are free to twist and turn relative to one another more freely than with flex cabling, limited only by the mechanical constraints of the garment material.

As example, FIG. 13 is a block diagram of two modules A' and B' of the four modules. Each module is equipped with a laser transceiver 51 and 53. As is known, each transceiver converts electronic signals into light and vice-versa and the transceiver communicates optically, by means of light, to send data and control information between the two modules as indicated by the bilateral arrows, without requiring electrical wires. As indicated by the vertical arrows those transceivers also send and receive the information to the adjacent underlying modules C and D, not illustrated in the figure.

As another example, FIG. 14 illustrates in block diagram form modules A" and B" which respectively include the familiar infra-red type transceivers 55 and 57. Those infra-red transceivers operate in like manner to the foregoing laser transceiver and provide an infra-red link between adjacent modules, a kind of communication familiar to the lay person who uses a television remote control. There is no necessity for a mechanical attachment between the modules. Because the foregoing types of communications between modules is "wireless", they do not offer the same slight degree of inter-module mechanical support as does the flex circuit. However, the hook and loop type fasteners sold under the VELCRO brand alone are sufficient to support the modules to the rear pocket panel.

It is also appreciated that the foregoing embodiment can be modified to incorporate additional pockets as needed for additional equipment.

Although the foregoing embodiment of the electronics package employs a computer system as the electronic element, as those skilled in the art appreciate on reading this specification, other kinds of electronic systems that is of large physical size may be separated into like distinct modules and substituted for the computer system elements. It is adapted to packaging "stand alone" electronic systems of any type on the body. It is also adaptable to other applications in which one finds need for a modularized large sized electronic device to bend about or conform to an irregular or curved surface. As example the invention may be applied to a backpack, bag, suitcase, briefcase, secured to a barrel, wall, table, or rack mounted system. Thus the electronic apparatus may be bent about one panel of a briefcase and looped around to the other opposed panel, bent about the corner of a wall, bent about the cylindrical side of the barrel and so on.

It is believed that the foregoing description of the preferred embodiments of the invention is sufficient in detail to enable one skilled in the art to make and use the invention. However, it is expressly understood that the detail of the elements presented for the foregoing purpose is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A body integral electronics package for mounting an electronic apparatus upon a human torso, wherein said package comprises:
   a garment for installation upon said human torso, wherein said garment includes a front and back panel for at least partially covering torso;
   a first pocket located on said front panel for containing said electronic apparatus wherein said pocket substantially covering the area overlying the breasts and midriff sections of said torso;
   a second pocket, located on the back panel of said garment, sized to receive a power supply;
   an electronic apparatus disposed in said front pocket and comprising a plurality of electronic modules spaced in an array which defines a surface area that covers at least the right and left sides of the chest and midriff area of said torso, said electronic modules of said array being closely spaced together for facilitating fast data transfer between said electronic modules, wherein said electronic apparatus further comprises flexible connecting means for interconnecting said electronic modules such that said electronic modules can move relative to each other, said flexible connecting means directly connecting said electronic modules located on the left side of said chest with electronic modules located on the right side of said chest, said flexible connecting means also directly interconnecting electronic modules on the chest portion with the modules on the midriff portion to thereby allow flexible electrical connection between said electronic modules on the left and right portions of the torso and between said electronic modules on the chest and midriff sections of the torso;
   a power supply disposed in said second Pocket for supplying electrical power to said plurality of electronic modules, wherein said power supply is sized independently of said electronic modules such that said power supply can be sized to provide sufficient power to each of the electronic modules of said electronic apparatus.

2. The invention as defined in claim 1, wherein said flexible connecting means comprises a laser transceiver means for sending and receiving data between said electronic modules by optical laser transmission.

3. The invention as defined in claim 1, wherein said flexible connecting means comprises an infra-red transceiver means for sending and receiving data between said electronic modules by infra-red transmission.

4. The invention as defined in claim 1, wherein said array comprises a first electronic module positioned in the left chest portion of said torso; a second electronic module positioned in the right chest portion of said torso; a third electronic module positioned in the left midriff portion of the torso; and a fourth electronic module located in the right midriff portion of said torso, and wherein a first flexible connection means directly electrically interconnects said first and second electronic modules; a second flexible connection means directly electrically interconnects said third and fourth electronic modules; a third flexible connection means directly electrically interconnects said first and third electronic modules; and a fourth flexible connection means directly electrically interconnects said first and third electronic modules such that said four electronic modules are directly electrically interconnected and can move relative to each other.

5. The invention as defined in claim 1 further comprising: fastening means attached to said garment for supporting said plurality of electronic modules and said power supply in said first and second pockets, respectively.

6. The invention as defined in claim 5, wherein said fastening means comprises: hook and loop type fastening means.

7. The invention as defined in claim 1 wherein said power supply for supplying electrical power to said plurality of electronic modules is larger than any of the electronic modules.

8. The invention as defined in claim 7, further comprising a flap of material extending from said first pocket to said second pocket to define a first electrical conduit on said garment; and flexible connection means received within said first electrical conduit for connecting electrical power from said power supply to said electronic apparatus.

9. The invention as defined in claim 1, further comprising a first small pocket and a second small pocket, said small pockets being located side by side on top of said first pocket.

10. In a garment packaged electronics apparatus adapted for wear by a human torso, said garment including a front panel for covering at least the chest and midriff portions of said torso and supporting electronics apparatus thereon, the improvement comprising:
   a first pocket located on said front panel for containing said electronic apparatus wherein said pocket and substantially covering the area overlying the breasts and midriff sections of said torso;
   fastening means for holding said front and back panel firmly against said torso, whereby at least said front and back pockets are firmly pressed against said torso;
   said first pocket holding said electronic apparatus;
   said electronic apparatus, comprising at least:
      first, second, third and fourth electronic modules, each said module including a rigid base;
      said first electronic module covering an area substantially as large as the left breast region of said torso;
      said second electronic module covering an area substantially as large as the right breast region of said torso;
      said third electronic module covering an area substantially as large as the left mid-riff region of said torso;

and said forth electronic module covering an area substantially as large as the right mid-riff region of said torso;

first hook and loop type fastening means for supporting said first module to said garment within said pocket;

second hook and loop type fastening means for supporting said second module to said garment within said pocket;

third hook and loop type fastening means for supporting said third module to said garment within said pocket;

fourth hook and loop type fastening means for supporting said fourth module to said garment within said pocket;

said first and second electronic modules being arranged adjacent one another and supported in spaced relationship on either side of a vertical axis; said third and fourth electronic modules being arranged adjacent one another and supported in spaced relationship on either side of a vertical axis; and said first and third electronic modules being arranged adjacent one another and supported in spaced relationship on either side of a horizontal axis; and said second and forth electronic modules being arranged adjacent one another and supported in spaced relationship about said horizontal axis;

first flexible electrical lead means interconnecting said first and second modules for electrically interconnecting said modules in said spaced relationship;

second flexible electrical lead means interconnecting said third and fourth modules for electrically interconnecting said modules in said spaced relationship;

third flexible electrical lead means interconnecting said first and third modules for electrically interconnecting said modules in said spaced relationship; and fourth flexible electrical lead means interconnecting said second and fourth modules for electrically interconnecting said modules in said spaced relationship;

whereby said pair of first and second modules and said pair of third and fourth modules may pivot relative to one another about said horizontal axis and said pair of first and third modules and said pair of second and fourth modules may pivot relative on one another about said vertical axis to adjust to the morphology of said torso and to relative movement between any of said chest and midriff sections of said torso;

said garment further including:

an opening to form a passage for a head on said torso, whereby said garment is supported on the shoulder section of said torso;

a second pocket, located on the back panel of said garment, sized to receive a power supply;

a power supply disposed in said second pocket for supplying electrical power to said plurality of electronic modules, wherein said power supply is sized independently of said electronic modules such that said power supply can be sized to provide sufficient power to each of the electronic modules of said electronic apparatus;

a flap of material on said garment, said flap extending from said first pocket to said second pocket to define a first electrical conduit on said garment;

electrical leads means received within said first electrical conduit for connecting current from said battery means to said electronic apparatus; and a third small pocket and a fourth small pocket, said small pockets being located side by side on top of said first pocket.

* * * * *